Figure 1:
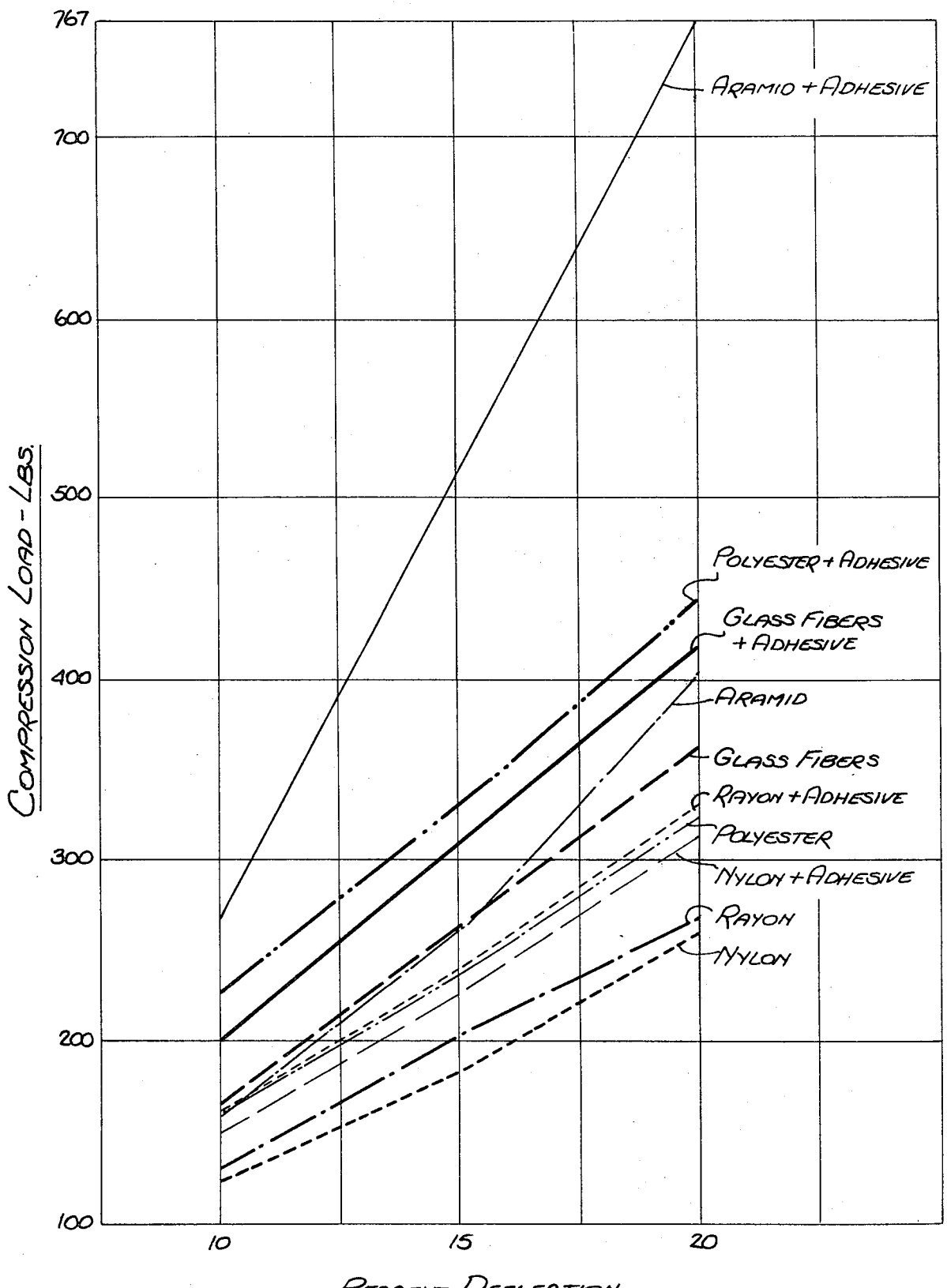

United States Patent [19]

Sperley

[11]  3,969,568

[45]  July 13, 1976

[54] ARAMID FLOC REINFORCEMENT OF RUBBER USING PARTICULAR ADHESIVE

[75] Inventor: Richard Jon Sperley, Detroit, Mich.

[73] Assignee: Uniroyal Inc., New York, N.Y.

[22] Filed: Dec. 4, 1974

[21] Appl. No.: 529,648

[52] U.S. Cl. .............................. 428/297; 57/140 C; 57/164; 152/357 R; 156/110 A; 156/123; 156/308; 156/326; 156/338; 427/385; 428/298; 428/395; 428/401; 428/474; 428/492

[51] Int. Cl.² .................... B32B 5/02; B32B 25/02; B32B 25/12; B32B 25/14

[58] Field of Search ........... 428/297, 390, 395, 401, 428/474, 492; 152/357; 57/140 C, 164; 427/385; 156/110 A, 110 C, 123, 308, 326, 338

[56] References Cited

UNITED STATES PATENTS

| | | | |
|---|---|---|---|
| 3,057,389 | 10/1962 | Dubetz et al. | 152/210 |
| 3,256,137 | 6/1966 | Danielson | 428/248 |
| 3,393,210 | 7/1968 | Speck | 260/37 |

Primary Examiner—J.C. Cannon
Attorney, Agent, or Firm—Bruce F. Jacobs

[57] ABSTRACT

Component adhesion in systems comprising (1) rubber, (2) an adhesive composition and (3) a fibrous reinforcement is greatly improved through use of an adhesive composition comprising a 1-aza-3,7-dioxabicyclo[3.3.0]octane in combination with a reinforcement of aramid fibers. The rubber systems are useful in the formation of tires, belts, hoses etc.

18 Claims, 2 Drawing Figures

ARAMID FLOC REINFORCEMENT OF RUBBER USING PARTICULAR ADHESIVE

This invention relates to the reinforcement of rubber by means of aramid fibers. More particularly it relates to the use of chopped aramid fibers, i.e. discrete discontinuous relatively short fibers, in conjunction with an adhesion system to get a higher reinforcement of the rubber. In addition, this invention relates to the use of a floc of aramid fibers in tires to improve the penetration resistance.

In certain rubber articles designed to withstand considerable stresses in use, the rubber is reinforced with comparatively inextensible materials. Thus rubber hose, belts, and tires are commonly reinforced with filamentary textiles in the form of yarns, cords or fabric. In such articles, it is important that the textile reinforcing material be firmly adhered to the rubber and remain effectively adhered even after the article has been subjected to repeated varying strains in use, because any separation and relative movement of the rubber and textile parts leads to abrasion between these parts and consequent failure.

While the adhesion system herein has been used for other textiles (see U.S. Pat. No. 3,256,137), and floc has been used as a reinforcing agent for tires (see U.S. Pat. No. 3,057,389), and aramid fibers are known for possible use as a tire cord (see U.S. Pat. No. 3,393,210), the combinaton, when the aramid is in the form of a chopped fiber floc, produces a rubber with greatly increased compressive modulus as compared to the normal additive results which would be expected.

SUMMARY OF THE INVENTION

It is an object of this invention to produce a reinforced elastomer blend, i.e. rubber, especially for use in tires, having a greatly increased compressive modulus.

It is a further object to provide a method of reinforcing any of the rubbery portions of a tire, especially the tread and breaker plies.

It is a further object to adhere a floc of chopped aramid textile fibers to rubber so as to reinforce the rubber.

FIG. 1 is a graph of the compression load results of Examples 1 and 2, wherein the compression modulus for various fibers both with and without the adhesive system is shown. It is readily apparent that the aramid floc plus the adhesive system shows synergistic results.

Figure 2:
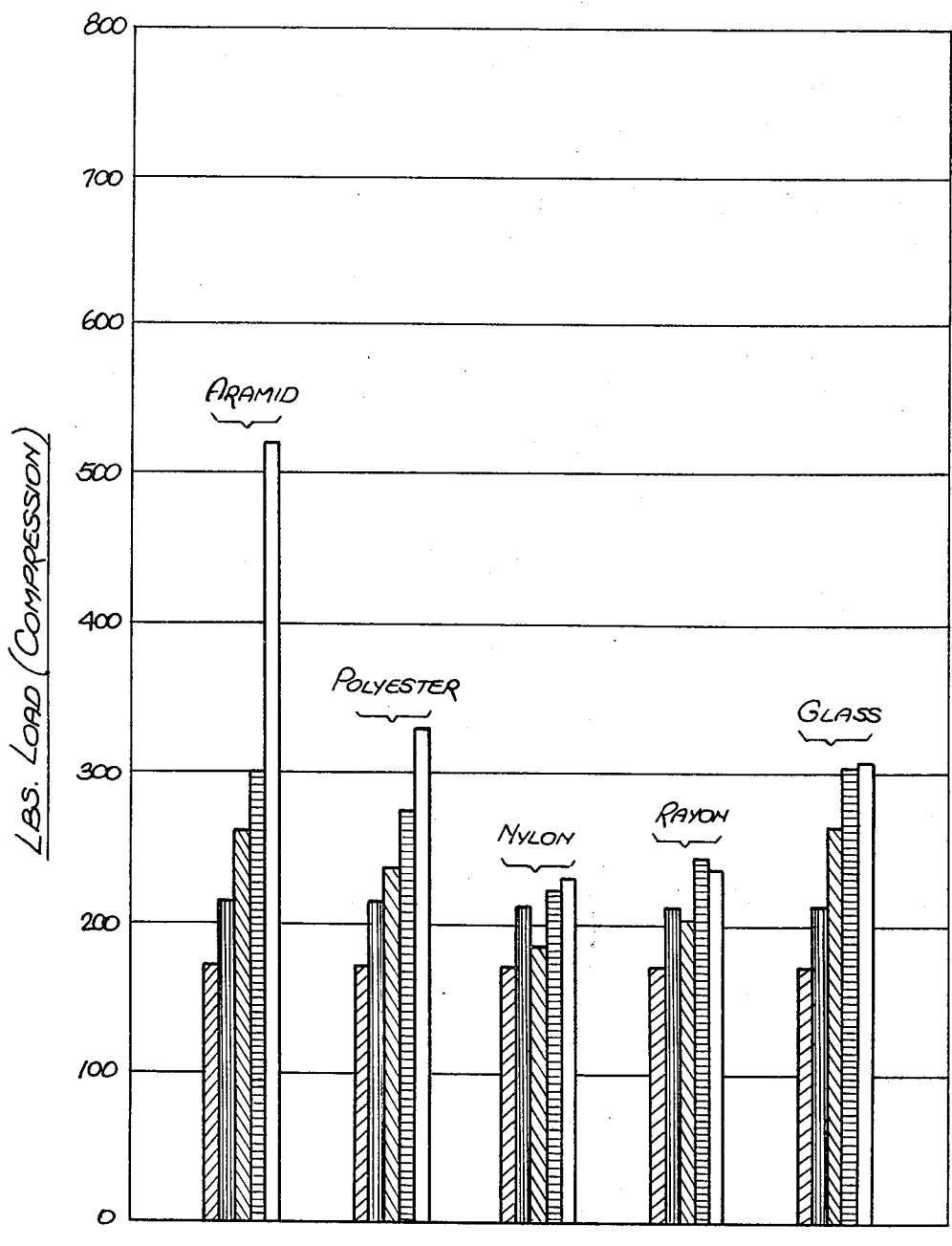

FIG. 2 is another graph of the results of Examples 1 and 2. It shows that the normal result when various flocs are added with the adhesive system is merely additive, i.e. the actual compression modulus is generally the sum of the base rubber modulus plus the increases due to the floc and to the adhesive system. Whereas there is a synergistic combination when aramid floc is used in conjunction with the adhesive system.

The rubber used in the present invention for making the reinforced rubbers for use in tire manufacture and for other purposes may be natural (Hevea) rubber or conjugated diolefine polymer synthetic rubber or mixtures of any of them including their reclaims. Such conjugated diolefine polymer synthetic rubbers are polymers of butadienes-1,3, e.g. butadiene-1,3, isoprene, 2,3-dimethylbutadiene-1,3, and polymers of mixtures thereof and copolymers of mixtures of one or more such butadienes-1,3, with one or more other polymerizable compounds which are capable of forming rubber copolymers with butadienes-1,3, for example, up to 60% by weight of such mixture of one or more monoethylenic compounds which contain a

group where at least one of the disconnected valences is attached to an electro-negative group, that is, a group which substantially increases the electrical dissymmetry or polar character of the molecule. Examples of compounds which contain a $CH_2=C<$ group and are copolymerizable with butadienes-1,3 are aryl olefines, such as styrene, vinyl toluene, alpha methyl styrene, chlorostyrene, dichlorostyrene, vinyl naphthalene; the alpha methylene carboxylic acids and their esters, nitriles and amides, such as acrylic acid, methyl acrylate, methyl methacrylate, acrylonitrile, methacrylonitrile, methacrylamide; vinyl pyridines, such as 2-vinyl pyridine, 2-methyl-5-vinyl pyridine; methyl vinyl ketone. Examples of such conjugated diolefine polymer synthetic rubbers are polybutadiene, polyisoprene, butadiene-styrene copolymers (SBR) and butadiene-acrylonitrile copolymers. The rubber may also contain conventional compounding and vulcanizing ingredients such as carbon black, rubber processing or softening oils which may be added as such or may be present from oil-extended rubbers, antioxidants, sulfur, zinc oxide and accelerators.

The aramid fibers used in the present invention are commercially available in yarn form under the trademarks "Fiber B", "Kevlar", "DP-01", and "Nomex", as well as others. Aramid is the generic name for fibers made from the condensation product of isophthalic or terephthalic acid and m- or p-phenylenediamine. "Fiber B" and "Kevlar" are generally understood to be products of the condensation of terephthalic acid and p-phenylenedianine while "Nomex" is understod to be a product of the condensation of isophthalic acid and m-phenylenediamine. Aramid is defined as "a manufactured fiber in which the fiber-forming substance is a long-chain synthetic aromatic polyamide in which at least 85% of the amide linkages are attached directly to two aromatic linkges." Further details of the fiber are shown in U.S. Pat. No. 3,393,210, incorporated herein by reference.

The aramid fibers which are useable herein are bare (so-called grey) and then choppped into short fibers so as to form the floc.

The grey aramid fibers are used in the form of a floc (flock) which is short lengths of fibers randomly disposed (oriented). The grey fibers more readily separate into individual discrete filaments when incorporated into the rubber mixture. The filaments may be of any length, up to about 5 inches in length, preferably about ⅛ (0.125) to 3 inches, most preferably about ¼ to 1 inch, though the actual size is not critical to the advantages noted herein.

The adhesion system useable herein is disclosed in U.S. Pat. No. 3,256,137 and comprises a mixture of a 1-aza-3,7-dioxabicyclo [3.3.0]-octane or derivative thereof and resorcinol or other meta disubstituted benzene in which each of the substitutents is an OH, $NH_2$ or $OCOCH_3$ radical (e.g. m-aminophenol, m-phenylenediamine, resorcinol monoacetate or resorcinol diacetate), or 1,5-naphthalenediol or a fusible partially reacted resorcinol-formaldehyde resin (condensate of resorcinol and formaldehyde in the ratio of 1 mole of resorcinol to about 0.5 to 0.8 mole of formaldehyde). Such fusible partially reacted resorcinolformaldehyde resins may be prepared in known manner by heating a concentrated aqueous solution of the resorcinol and formaldehyde, with or without a catalyst such as oxalic acid. The Ball and Ring softening point (ASTM: E28-58T) of such fusible partially reacted resins will generally be from about 60°C. to 120°C. The 1-aza-3,7-dioxabicyclo[3.3.0]octane and resorcinol, or partially reacted resorcinol-formaldehyde resin, or such other material, react on heating, as in the vulcanization of the rubber to form an infusible resin.

The 1-aza-3,7-dioxabicyclo[3.3.0]octanes that may be used are compounds having the general formula

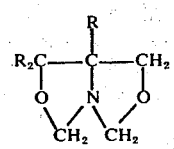

where R is hydrogen, methyl, ethyl, n-propyl, isopropyl, methylol, beta-hydroxyethyl, acetoxymethyl or methoxymethyl.

These compounds are described in the paper "Some New Derivatives of Amino Hydroxy Compounds" by Murray Senkus, in Jour. Amer. Chem. Soc. 67 1515–1519 (1945) and in U.S. Pat. No. 2,448,980 to William B. Johnston and, except where R is acetoxymethyl or methoxymethyl are made by the reaction of two moles of formaldehyde or paraformaldehyde with 1 mole of the selected 2-amino-1,3-propanediol. For example, 1-aza-3,7-dioxabicyclo[3.3.0]octane is made by reating 1 mole of 2-amino-1,3-propanediol with 2 moles of paraformaldehyde; 1-aza-5-methyl-3,7-dioxabicyclo[3.3.0] octane is made by reacting 1 mole of 2-amino-2-methyl-1,3-propanediol with 2 moles of paraformaldehyde; 1-aza-5-methylol-3,7-dioxabicyclo[3.3.0]octane the preferred compound is made by reacting 1 mole of 2-amino-2-methylol-1,3-propanediol with 2 moles of paraformaldehyde, etc. The 1-aza-5-acetoxymethyl-3,7-dioxabicyclo[3.3.0] octane is made by reacting 1-aza-5-methylol-3,7-dioxabicyclo[3.3.0] octane with acetic anhydride in the presence of pyridine. The 1-aza-5-methoxymethyl-3,7-dioxabicycol[3.3.0]octane is made by reacting the 1-aza-5-methylol-3,7-dioxabicyclo [3.3.0]octane with dimethyl sulfate in a strongly basic alkalimetal hydroxide solution.

The components of the present invention, i.e. the solid rubber, the aramid floc, the adhesion system and any other conventional compounding and vulcanizing ingredients, may be combined by means of any conventional equipment, such as a mill or a Banbury mixer, which provides a thorough mixing action. The aramid floc is used in about 0.5 to 50 parts per 100 parts of rubber, preferably 1 to 20 parts. The ratio of the two adhesion system components is not critical and generally will be from one-half to two moles of the 1-aza-3,7-dioxabicyclo[3.3.0]octane per mole of the resorcinol, or resorcinol-formaldehyde condensate or other resin component. The amount of adhesion components mixed with the rubber is not critical. Generally, 0.5 to 8 parts, and preferably 1 to 4 parts of the two components (total) per 100 parts of the rubber will be mixed in the rubber compound.

The following examples illustrate the invention. All parts and percentages referred to herein are by weight unless otherwise indicated.

EXAMPLE 1

A rubber compound masterbatch was prepared with the following ingredients: 50 parts natural rubber, 20 parts cis-polybutadiene, 41.25 parts oil extended styrene-butadiene rubber (23.5% styrene), 13.75 parts petroleum distillate oil, 50 parts carbon black, 5 parts activated zinc oxide, 1 part stearic acid, 0.5 parts Betanox Special (antioxidant of Uniroyal, Inc.) 1 part cyclohexylbenzothiazole disulfate, 0.2 parts diphenyl guanidene, and 3 parts sulfur.

The masterbatch was then used to make up six blends as shown in Table I having (1) no floc, (2) aramid (Kevlar) floc, (3) polyester floc, (4) nylon floc, (5) rayon floc, and (6) glass fiber (RICS) floc, with the flocs being added in equal volume loadings. All of the flocs were nominally ½ inch in length i.e. ¼ to 1 inch fibers.

The blends were each cured for 60 minutes at 293°F. and physical properties were determined with the results as shown in Table I. For the compression modulus tests the samples were cured for 79 minutes at 293°F.

Table I

|  | A871MB | A871 | A872 | A873 | A874 | A875 |
|---|---|---|---|---|---|---|
| Ingredients |  |  |  |  |  |  |
| Masterbatch | 185.70 | 185.70 | 185.70 | 185.70 | 185.70 | 185.70 |
| Aramid |  | 4.00 |  |  |  |  |
| Polyester |  |  | 4.00 |  |  |  |
| Nylon |  |  |  | 3.30 |  |  |
| Rayon |  |  |  |  | 4.22 |  |
| Glass fibers |  |  |  |  |  | 6.60 |
| Physical Properties |  |  |  |  |  |  |
| Mill Grain |  |  |  |  |  |  |
| Modulus-100% |  | 1050 | 775 | 250 | 275 | 700 |
| 200% |  | 1225 | 1000 | 775 | 775 | 1050 |
| 300% |  | — | 1500 | 1350 | 1350 | — |
| Tensile |  | 1575 | 1875 | 2150 | 1800 | 1450 |
| % Elongation |  | 245 | 380 | 440 | 385 | 285 |
| Shore A Hardness |  | 73 | 67 | 62 | 63 | 67 |
| Cross Grain |  |  |  |  |  |  |
| Modulus-100% |  | 425 | 350 | 225 | 225 | 475 |
| 200% |  | 850 | 800 | 650 | 650 | 850 |
| 300% |  | — | 1325 | 1175 | 1200 | — |
| Tensile |  | 1100 | 1625 | 1950 | 1675 | 1550 |
| % Elongation |  | 265 | 360 | 440 | 380 | 320 |
| Compression Modulus (Compression Strain, lbs. force) |  |  |  |  |  |  |
| 10% Compression | 117 | 159 | 160 | 123 | 130 | 166 |
| 15% Compression | 173 | 261 | 236 | 183 | 202 | 264 |

Table I-continued

|  | A871MB | A871 | A872 | A873 | A874 | A875 |
|---|---|---|---|---|---|---|
| 20% Compression | 239 | 400 | 322 | 258 | 267 | 362 |

EXAMPLE 2

The procedure of Example 1 was repeated using the same masterbatch and flocs as indicated, but further incorporating in each of the blends before curing, an example of the adhesion system usable herein.

1.50 parts of resorcinol monoacetate (RMA) and 1.75 parts of 1-aza-5-methylol-3,7-dioxabicyclo[3.3.0]octane(GDUE).

The samples were then cured as in Example 1 and physical properties were determined with the results as shown in Table II.

The fibers treated as above were then incorporated into the masterbatch of Example 1 with the adhesion system of Example 2. Test samples were prepared as in the previous Example and the compression modulus results were as follows:

|  | Compression Modulus Lbs. Force | | |
|---|---|---|---|
|  | 10% | 15% | 20% |
| Aramid, treated as above | 514 | 894 | 1212 |
| Aramid, untreated | 266 | 519 | 764 |
| Nylon, treated as above | 158 | 237 | 327 |
| Nylon, untreated | 150 | 225 | 313 |

Table II

|  | A871MB | A876 | A877 | A878 | A879 | A880 |
|---|---|---|---|---|---|---|
| Ingredients | | | | | | |
| Masterbatch | 185.70 | 185.70 | 185.70 | 185.70 | 185.70 | 185.70 |
| RMA | 1.50 | 1.50 | 1.50 | 1.50 | 1.50 | 1.50 |
| GDUE | 1.75 | 1.75 | 1.75 | 1.75 | 1.75 | 1.75 |
| Aramid |  | 4.00 |  |  |  |  |
| Polyester |  |  | 4.00 |  |  |  |
| Nylon |  |  |  | 3.30 |  |  |
| Rayon |  |  |  |  | 4.22 |  |
| Glass fibers |  |  |  |  |  | 6.60 |
| Physical Properties | | | | | | |
| Mill Grain | | | | | | |
| Modulus-100% |  | 1325 | 775 | 625 | 575 | 950 |
| 200% |  | — | 1175 | 1250 | 1075 | 1300 |
| 300% |  | — | 2025 | 1775 | 1700 | — |
| Tensile |  | 1400 | 2125 | 1875 | 1800 | 1650 |
| % Elongation |  | 150 | 310 | 325 | 320 | 260 |
| Shore A Hardness |  | 73 | 69 | 65 | 66 | 70 |
| Cross Grain | | | | | | |
| Modulus-100% |  | 625 | 400 | 425 | 400 | 550 |
| 200% |  | 1150 | 875 | 1050 | 875 | 1000 |
| 300% |  | — | 1500 | 1675 | 1525 | — |
| Tensile |  | 1275 | 1850 | 2000 | 1700 | 1550 |
| % Elongation |  | 235 | 350 | 355 | 335 | 280 |
| Compression Modulus (Compression Strain, lbs. force) | | | | | | |
| 10% Compression | 143 | 266 | 229 | 150 | 160 | 200 |
| 15% Compression | 213 | 519 | 330 | 225 | 235 | 307 |
| 20% Compression | 283 | 764 | 442 | 313 | 327 | 416 |

A comparison of the results of Examples 1 and 2, as is shown visually by FIGS. 1 and 2 shows that the use of either a floc or the adhesion system alone will result in a higher compression modulus and lower elongaton, i.e. a stiffer rubber. When both a floc and the adhesion system are used together, the results show that for polyester, nylon, rayon, or glass fiber the results are essentially only additive, i.e. the overall increase is approximately the sum of the two increases. However, for aramid (Kevlar) floc, the combination shows synergistic results much greater than the mere sum of the two effects.

EXAMPLE 3

In order to determine what effect the spin finish, which is normally present on the aramid fibers when purchased, has on the present invention, the chopped aramid and some chopped nylon with a similar finish were both treated to remove the spin finish. Each group of fibers (about ½ inch in length) were treated by first washing with petroleum ether and then ethanol. The fibers were then dried in a vacuum oven overnight at 60°F. This is in accord with ASTM Procedure D2257-69.

Accordingly, it can be seen that removal of the spin finish greatly improves the results with aramid floc, while having almost no effect on nylon floc.

EXAMPLE 4

The procedures of the previous Examples were repeated using an all natural rubber based blend with HAF-carbon black therein. The masterbatch composition was as follows: 100 parts natural rubber, 0.10 parts zinc-2-benzamid thiophenate peptizer, 45 parts HAD carbon black, 5 parts activated zinc oxide, 2.50 parts stearic acid, 6 parts pine tar oil, 1.50 parts N-alkyl, naphthenyl-p-phenylene diamine, 0.50 parts phenol-formaldehyde tackifying resin, 0150 parts N-t-butyl-2-benzothiazole sulfenamide, 0.10 parts PVI retarder, and 2.65 parts flowers of sulfur.

To the above masterbatch was then added the respective flocs in the amounts shown previously in Example 1, the samples milled and cured and compression modulus tested as previously. The results were:

| Compression | Compression Modulus | | |
| --- | --- | --- | --- |
| Compression | 10% | 15% | 20% |
| No floc | 118 | 179 | 235 |
| Aramid | 233 | 372 | 516 |
| Polyester | 203 | 302 | 389 |
| Nylon | 164 | 224 | 300 |
| Rayon | 163 | 233 | 302 |
| Glass fibers | 209 | 302 | 402 |

To mixtures of the above were added adhesion system chemicals as in Example 2 (with respect to Example 1). 1.50 parts of resorcinol monacetate and 1.75 parts of 1-aza-5-methylol-3,7-dioxabicyclo[3.3.0]octane were added and the results were as follows:

| | Compression Modulus | | |
| --- | --- | --- | --- |
| Compression Strain | 10% | 15% | 20% |
| Adhesion system plus no floc | 206 | 295 | 377 |
| Adhesion system plus Aramid | 371 | 608 | 857 |
| Adhesion system plus Polyester | 283 | 377 | 500 |
| Adhesion system plus Nylon | 208 | 284 | 388 |
| Adhesion system plus Rayon | 206 | 291 | 377 |
| Adhesion system plus Glass fibers | 232 | 322 | 427 |

The synergistic combination of the adhesion system and aramid floc results in greatly increased compression moduli whereas only slight increases are noted with the other chopped fibers.

EXAMPLE 5

The procedures of Examples 1 and 2 were repeated using a natural rubber based stock with hydrated silica as the primary filler. The flocs and adhesion systems (both with parts used), and results were as follows:

| | A | B | C | D | E | F |
| --- | --- | --- | --- | --- | --- | --- |
| Floc | | | | | | |
| Aramid | — | 4.00 | — | — | 4.00 | — |
| Nylon | — | — | 4.00 | — | — | 4.00 |
| Adhesion system | | | | | | |
| RMA | — | — | — | 1.50 | 1.50 | 1.50 |
| GDUE | — | — | — | 1.75 | 1.75 | 1.75 |
| Compression Strain | Compression Modulus | | | | | |
| 10% | 152 | 160 | 126 | 260 | 480 | 256 |
| 15% | 222 | 286 | 200 | 370 | 790 | 404 |
| 20% | 308 | 426 | 280 | 480 | 1040 | 559 |

These results again show that there is synergism between the aramid floc and the adhesion system.

EXAMPLE 6

To show that the synergism of the adhesion system with the aramid floc does not repeat for aramid cord (though there is enhanced cord adhesion), H-adhesive strength was determined according to ASTM D2138-72. Samples were prepared using the all natural rubber masterbatch of Example 4 with and without the adhesion system and nylon, rayon, polyester, and aramid cords. The samples used were cured for 45 minutes at 293°F. and tested at 250°F.

The results were as follows:

| | Pull (lbs.) | |
| --- | --- | --- |
| | No Adhesion System | Adhesion System |
| Nylon results | 4.2 | 17.6 |
| Rayon results | 3.1 | 15.3 |
| Polyester results | 4.2 | 5.1 |
| Aramid results | 6.1 | 16.1 |

Thus, the percent improvement for aramid cord was actually less than for nylon and rayon.

What is claimed is:

1. A reinforced rubber composition with increased compression modulus comprising (1) rubber, (2) 1-aza-3,7-dioxabicyclo[3.3.0]octane or derivatives thereof, (3) a material selected from the group consisting of resorcinol, m-aminophenol, m-phenylenediamine, resorcinol monoacetate, resorcinol diacetate, 1,5-naphthalene-diol, and partially reacted resorcinol-formaldehyde resins, and (4) discontinuous discrete fibers of aramid textiles of a length up to about 5 inches.

2. The reinforced rubber of claim 1 wherein the rubber is selected from natural rubber, conjugated diolefin polymer synthetic rubber, their reclaims, and mixtures thereof.

3. The reinforced rubber of claim 1 wherein (2) is selected from
1-aza-3,7-dioxabicyclo[3.3.0]octane
1-aza-5-methyl-3,7-dioxabicyclo[3.3.0]octane
1-aza-5-ethyl-3,7-dioxabicyclo[3.3.0]octane
1-aza-5-n-propyl-3,7-dioxabicyclo[3.3.0]octane
1-aza-5-isopropyl-3,7-dioxabicyclo[3.3.0]octane
1-aza-5-methylol-3,7-dioxabicyclo[3.3.0]octane
1-aza-5-beta-hydroxyethyl-3,7-dioxabicyclo[3.3.0]octane
1-aza-5-acetoxymethyl-3,7-dioxabicyclo[3.3.0]octane and
1-aza-5-methoxymethyl-3,7-dioxabicyclo[3.3.0]octane.

4. The reinforced rubber of claim 1 wherein (4) is fibers having a length of from ¼ to 3 inches.

5. The reinforced rubber of claim 1 wherein (4) is randomly oriented throughout the rubber.

6. The reinforced rubber of claim 1 wherein (4) is treated to remove the spin finish.

7. The reinforced rubber of claim 1 wherein (2) is 1-aza-5-methylol-3,7-dioxabicyclo[3.3.0]octane.

8. The reinforced rubber of claim 7 wherein (3) is resorcinol monoacetate.

9. A solid vulcanizable rubber composition containing 1-aza-5-methyl-3,7-dioxabicyclo[3.3.0]octane, resorcinol monoacetate, and discontinuous discrete fibers of grey aramid textiles of a length up to about 5 inches.

10. The use of reinforced rubber composition of claim 1 in a tire.

11. A method of reinforcing rubber having incorporated therein 1-aza-3,7-dioxabicyclo[3.3.0]octane or derivative thereof and a material selected from the group consisting of resorcinol, m-aminophenol, m-phenylenediamine, resorcinol monoacetate, resorcinol diacetate, 1,5-naphthalene-diol, and partially reacted resorcinol-formaldehyde resins; comprising embedding therein prior to vulcanization discontinuous discrete fibers of grey aramid textiles of a length up to about five inches.

12. The method as in claim 11 wherein the rubber is selected from natural rubber, conjugated diolefin polymer, synthetic rubber, their reclaims, or mixtures thereof.

13. The method as in claim 11 wherein the octane compound is selected from
- 1-aza-3,7-dioxabicyclo[3.3.0]octane
- 1-aza-5-methyl-3,7-dioxabicyclo[3.3.0]octane
- 1-aza-5-ethyl-3,7-dioxabicyclo[3.3.0]octane
- 1-aza-5-n-propyl-3,7-dioxabicyclo[3.3.0]octane
- 1-aza-5-isopropyl-3,7-dioxabicyclo[3.3.0]octane
- 1-aza-5-beta-hydroxyethyl-3,7-dioxabicyclo[3.3.0]octane
- 1-aza-5-acetoxymethyl-3,7-dioxabicyclo[3.3.0]octane and
- 1-aza-5-methoxymethyl-3,7-dioxabicyclo[3.3.0]octane.

14. The method as in claim 11 wherein the fibers are from about ⅛ to 3 inches long.

15. The method as in claim 11 wherein the fibers are randomly oriented.

16. The method as in claim 11 wherein the grey aramid fibers are treated to remove the spin finish.

17. The method as in claim 11 wherein the octane compound is 1-aza-5-methyl-3,7-dioxabicyclo[3.3.0]octane.

18. The method as in claim 17 wherein the material is resorcinol monoacetate.

* * * * *